Patented Mar. 12, 1940

2,192,930

UNITED STATES PATENT OFFICE 2,192,930

LUBRICANT

Paul C. Panagiotákos, Lawrence, Mass., assignor to The Atlantic Refining Company, Philadelphia, Pa., a corporation of Pennsylvania No Drawing. Application October 30, 1936, Serial No. 108,367

5 Claims. (Cl. 87—9)

The present invention relates to the art of lubrication, and more particularly to the lubrication of surfaces engaging under extreme pressure, as for example, the rubbing surfaces of hypoid gears, free wheeling transmission, speed reducers and the like.

The general tendency in the design of modern machinery has been toward a higher ratio between power and "dead weight." This is especially true in the automotive industry, and in recent years certain types of gears and other mechanisms have been developed with the operating pressures on the working surfaces so high that ordinary mineral oil lubricants will not provide sufficient lubrication for satisfactory operation.

Heretofore it has been thought that lubrication consists in maintaining a film of oil between the rubbing surfaces, thereby preventing them from coming into contact with one another and thus preventing wear. That this condition exists in well lubricated bearings is well known, but this conception of lubrication does not apply to highly loaded gears. In well lubricated bearings the loads rarely exceed 2000 lbs. per sq. in. projected area and the rubbing speeds are generally high enough to maintain a film of oil which separates the rubbing surfaces. In automobile gears, the pressures between gear teeth reach very high values and even the most viscous oils or greases cannot be retained between the surfaces of the teeth in a sufficiently thick film to prevent metal to metal contact, particularly when operating temperatures of 210° F. or higher are commonly encountered.

It has been known that compounded lubricants such as, for example, mineral oils containing fatty oils, fatty acids, metallic soaps, sulfur or combined chlorine, possess lubricating qualities which render them suitable for use under high operating pressures. These compounded oils function satisfactorily under conditions which would cause failure of an unblended mineral oil, if used alone. It is believed that the successful use of such compounded oils depends upon the adsorption and reaction or union of certain components of these oils with the metal surfaces whereby a film of metallic compound, such as, for example, iron sulfide or chloride is formed. It appears that such a film or plating has a low coefficient of friction and that satisfactory operation of heavily loaded bearings or gears depends upon the formation and maintenance of such a film, and not upon the retaining of a film of oil between the bearing surfaces. The hydrocarbon oil constituent of an extreme pressure lubricant serves primarily to remove frictional heat, to wash away any solid particles which may result from wear, and to prevent oxidation of the engaging surfaces.

I have discovered that organic nitro compounds, and more particularly heterocyclic nitro compounds, when admixed with hydrocarbon oils, are of special utility in the field of extreme pressure lubrication. Among the compounds which may be employed in accordance with my invention are nitrothiophene, nitrofurane and nitropyridine, as well as the alkyl and aryl substituted homologues thereof. The latter compounds include, for example, methyl, ethyl and phenyl nitrothiophene, methyl nitrofurane, and butyl nitropyridine. Furthermore, the heterocyclic nitro compounds may contain halogen, for example, chlorine, bromine or fluorine.

In preparing my lubricant, I add to a suitable mineral oil one or a mixture of two or more heterocyclic nitro compounds in quantity sufficient to improve the lubricanting value of the oil to any desired extent, depending upon the operating conditions under which the lubricant is to be used. I have found that the quantity of the nitro compound required, in general, does not exceed substantially 5% by weight of my composition. Quantities as small as 3%, or even 1% or less, have been found to improve lubricating oils to a satisfactory extent. In certain instances, 0.1% to 0.2% by weight of the nitro compound was sufficient to improve the lubricating oil to the desired extent. In preparing my lubricant, I may obtain a homogeneous solution or stable suspension of the heterocyclic nitro compound in mineral oil by agitating the mixture at normal or elevated temperatures, or I may dissolve the nitro compound in a suitable solvent and add the resulting solution to the oil, thereafter removing the solvent by vaporization.

The mechanism by which the heterocyclic nitro compounds in lubricating oils function to improve the load-bearing ability and other properties thereof is not entirely understood. It appears, however, that the functioning is dependent upon the adsorption of the compounds upon the metal surfaces of the bearings or other lubricated parts, and the reaction or chemical combination of such compounds with the metal under the influence of localized high temperature and pressure to form a coating or plating having a low coefficient of friction which is resistant to seizure under high operating pressures.

A typical example of my improved lubricant is as follows:

(1) 97 parts by weight of a lubricating oil having a Saybolt universal viscosity at 210° F. of 155 seconds and an A. P. I. gravity of 22.5° was admixed with 3 parts by weight of nitrothiophene and a homogeneous solution was obtained. Upon testing the lubricant in an Almen Extreme Presssure Lubricant Testing Machine at 600 R. P. M., a pressure of 22,000 lbs./sq. in. projected bearing area was sustained before seizure of the bearing occurred, whereas the unblended lubricating oil failed at a pressure of 2,000 lbs./sq. in. projected bearing area.

It will be seen from the above example, that the addition of a heterocyclic nitro compound to a hydrocarbon oil improves the lubricating value of such an oil to a marked degree, and imparts to the oil certain properties which render it suitable for use in the lubrication of surfaces engaging under extreme pressure. Under certain conditions, for example in the lubrication of transmissions or gear drives where elevated temperatures are not normally encountered, it has been found that the halogenated, and particularly the chlorinated heterocyclic nitro compounds are more efficient than the unchlorinated compounds in their ability to improve the load-bearing capacity of the lubricants.

Furthermore, I have found that heterocyclic nitro compounds having as substituents long hydrocarbon chains or substituted hydrocarbon chains, are capable of not only improving the load-bearing capacity of hydrocarbon oils but also effect a lowering of the coefficient of friction, or improve the "oiliness" of the lubricant. The nitro compounds containing long chain alkyl radicals such as cetyl, lauryl, dodecyl and oleyl, and the substitution products thereof, are representative samples of this type of materials.

While I have described my invention with reference to the lubrication of gears and bearings operating under heavy loads, I do not intend to limit myself thereto, but contemplate the use of my lubricant in operations such as the cutting and boring of metals, in which conditions of extreme pressure and temperature are normally encountered, and also in the lubrication of mechanisms operating under moderate pressures, as for example, the crankcase bearings and cylinder walls of internal combustion engines. Furthermore, my compounded oil may be utilized as a base in the preparation of thickened oils, i. e., greases, by the addition thereto of soaps or other conventional thickening agents, in order to obtain lubricants of desired viscosity. My compounded oil may also be blended with fatty oils, fatty acids, synthetic esters, heavy metal soaps and the like, or the heterocyclic nitro compounds, per se, may be admixed with fatty oils, for the lubrication of mechanisms in which the presence of a fatty oil is desirable.

What I claim is:

1. A lubricant comprising a hydrocarbon oil and a small quantity, sufficient to impart extreme pressure properties to said oil, of a nitrothiophene.

2. A lubricant comprising a hydrocarbon oil and a small quantity, sufficient to impart extreme pressure properties to said oil, of a halogenated nitrothiophene.

3. The method of retarding wear, scuffing or seizing of relatively moving metallic surfaces, which comprises maintaining therebetween a lubricating film that provides effective lubrication at pressures and speeds at which mineral lubricating oils normally will not be retained between said surfaces, said film resulting from the interposition between said surfaces of a petroleum lubricating oil containing as a film forming agent, a small amount of a nitrothiophene.

4. A lubricant comprising a viscous hydrocarbon oil and a small quantity, sufficient to impart extreme pressure properties to said oil, of an alkylated nitrothiophene.

5. A lubricant comprising a viscous hydrocarbon oil and a small quantity, sufficient to impart extreme pressure properties to said oil, of an arylated nitrothiophene.

PAUL C. PANAGIOTÁKOS.